(12) United States Patent
Jagannath (10) Patent No.: US 11,263,716 B2
(45) Date of Patent: Mar. 1, 2022

(54) RENDERING DIGITIZED SERVICES IN A SMART ENVIRONMENT

(71) Applicant: ZED Digital, Blacklick, OH (US)

(72) Inventor: Sumithra Jagannath, Blacklick, OH (US)

(73) Assignee: ZED Digital, Blacklick, OH (US)

( * ) Notice: Subject to any disclaimer, the term of this patent is extended or adjusted under 35 U.S.C. 154(b) by 483 days.

(21) Appl. No.: 16/223,936

(22) Filed: Dec. 18, 2018

(65) Prior Publication Data

US 2020/0193548 A1    Jun. 18, 2020

(51) Int. Cl.
| | |
|---|---|
| *G06Q 50/30* | (2012.01) |
| *G07B 15/02* | (2011.01) |
| *G06Q 10/02* | (2012.01) |
| *G07C 9/20* | (2020.01) |

(52) U.S. Cl.
CPC .......... *G06Q 50/30* (2013.01); *G06Q 10/02* (2013.01); *G07B 15/02* (2013.01); *G07C 9/20* (2020.01)

(58) Field of Classification Search
CPC ........ G06Q 10/00–10/30; G06Q 50/30; G06Q 10/02; G07C 9/20; G07B 15/02
See application file for complete search history.

(56) References Cited

U.S. PATENT DOCUMENTS

| | | | |
|---|---|---|---|
| 8,332,272 B2 | 12/2012 | Fisher | |
| 8,523,069 B2 | 9/2013 | Hammad et al. | |
| 8,731,835 B2 | 5/2014 | Chidlovskii et al. | |
| 8,942,677 B2 | 1/2015 | Dixon et al. | |
| 9,239,993 B2 | 1/2016 | Bergdale et al. | |
| 9,514,589 B2 | 12/2016 | Raina et al. | |
| 9,596,359 B2 | 3/2017 | Carlson et al. | |
| 9,715,773 B2 | 7/2017 | Clemente et al. | |
| 9,792,604 B2 | 10/2017 | Gray et al. | |
| 9,813,850 B2 | 11/2017 | Lee et al. | |
| 9,881,433 B2 | 1/2018 | Bergdale et al. | |
| 2002/0040308 A1 | 4/2002 | Hasegawa et al. | |
| 2003/0069763 A1* | 4/2003 | Gathman | G06Q 30/02 705/5 |

(Continued)

FOREIGN PATENT DOCUMENTS

| | | |
|---|---|---|
| KR | 20070080676 A | 8/2007 |
| WO | WO-2007118521 A1 | 10/2007 |

OTHER PUBLICATIONS

Exploring ticketing approaches using mobile technologies: QR Codes, NFC and BLE Published by Faculty of Engineering of the University of Porto (Year: 2015).*

(Continued)

*Primary Examiner* — Zeina Elchanti
(74) *Attorney, Agent, or Firm* — Schwegman Lundberg & Woessner, P.A.

(57) ABSTRACT

Techniques of rendering digitized services in a smart environment are described. The techniques involve identification of a first action based on at least one of a user input and a user schedule. In an example, the first action may include visiting a restricted setup to avail services provided therein. Based on the first action, a plurality of second actions may be performed to render the services to the user. The techniques may further involve tracking the presence of the user at the restricted setup in real-time, and using the tracking information to plan the first and the second actions for other users.

20 Claims, 4 Drawing Sheets

(56) References Cited

U.S. PATENT DOCUMENTS

| | | | |
|---|---|---|---|
| 2007/0276944 A1* | 11/2007 | Samovar | G07C 9/27 709/225 |
| 2011/0153495 A1 | 6/2011 | Dixon et al. | |
| 2015/0053757 A1* | 2/2015 | Williams | G07B 11/00 235/375 |
| 2015/0084741 A1 | 3/2015 | Bergdale et al. | |
| 2015/0095197 A1* | 4/2015 | Eramian | G06Q 30/0284 705/26.64 |
| 2015/0120558 A1 | 4/2015 | Andrews et al. | |
| 2015/0178698 A1 | 6/2015 | Schulz et al. | |
| 2015/0235477 A1 | 8/2015 | Simkin et al. | |
| 2016/0231129 A1 | 8/2016 | Erez et al. | |
| 2017/0116547 A1* | 4/2017 | Klinger | G07B 11/00 |
| 2017/0206201 A1 | 7/2017 | Chidlovskii | |
| 2018/0068315 A1 | 3/2018 | Bergdale et al. | |
| 2018/0107950 A1* | 4/2018 | Gonzalez | G06Q 10/025 |
| 2018/0278422 A1* | 9/2018 | Young | H04L 9/3247 |
| 2018/0293523 A1* | 10/2018 | Bergdale | G06Q 10/025 |

OTHER PUBLICATIONS

"International Application Serial No. PCT US2019 066616, International Search Report dated Mar. 17, 2020", 2 pgs.
"International Application Serial No. PCT US2019 066616, Written Opinion dated Mar. 17, 2020", 6 pgs.
Rehrl, Karl, et al., "Assisting Multimodal Travelers: Design and Prototypical Implementation of a Personal Travel Companion", IEEE Transactions on Intelligent Transportation Systems, vol. 8, No. 1, Mar. 2007, (Mar. 2007), 31-42.

* cited by examiner

RENDERING DIGITIZED SERVICES IN A SMART ENVIRONMENT

BACKGROUND

With advancement in technology, digitization has become a norm these days. Various services are being digitized for ease and convenience of users. For instances, counter and telephone based bookings for multiple services, such as transport services, hospitals, theatres, restaurants, hotels, and malls have been replaced by digital bookings that may be made using a user device. To avail the services, the user device may be used to book tickets for transport services, to make appointments to visit places such as hospital, restaurant, and hotels, and to avail other similar services. The user device may provide multiple interfaces to avail multiple services offered at different places. For instance, an application may provide an interface to buy tickets for commuting between locations and another application may provide another interface to book an appointment at the hospital. Further, advanced cities, also known as smart cities, are being developed where all such service may be digitized and interconnected.

DETAILED DESCRIPTION

Digitization of services has revolutionized the way service industry works, making service providers to move away from traditional methods and platforms of rendering services to new digitized platform. A plurality of digital platforms and applications have been developed to provide multiple services to the users. For instance, an application may be used to plan a trip for a user planning to commute from one location to another location, while another application may be used to book appointments at various places of interest, such as hotels, hospitals, and theatres. The user may thus open the different applications on his user device and perform the desired activities, such as booking tickets.

However, in case a user needs to use varying services, the user may require to access multiple applications offering the varying services offered by multiple service providers. For instance, in a case the user may wish to watch a movie at a particular theatre located at a location distant from the user's home. In such situations, the user may first use a travel application, from among multiple travel application, to first book tickets for a particular means of transport to commute to the theatre. The user may then use a second application to purchase tickets to the theatre. Using different applications to avail multiple services makes the entire process tedious and degrades user experience. Further, the user may have to visit multiple applications offering alternate options for the same service, to select an optimum service provider. For instance, the user may have to visit applications of different cab service providers, bus service providers, local tram or rail network service providers before finalizing on a particular mode of transport and service provider for the commute.

Operating multiple applications may be tedious and time consuming for the users. Further, having multiple applications running on the user device may be resource consuming and may affect operational efficiency of the user device. Further, a user may need to provide details of desired commute, service, time, and date of availing the service into the multiple applications. The users may thus feel discomfort using the digital platform and opt not to use the applications and resort to other manual means to avail the services.

Further, once a service, such as an appointment at a hospital, travel using a particular transport system is booked, a ticket or an appointment slip may be generated. The ticket may be one of a physical ticket or an electronic ticket. When the user reaches the place of interest to avail the services, the appointment may be authenticated either manually or using a validation device. In an example, the user or an operator may have to scan a QR code on the electronic ticket or a QR code on a physical ticket on the validation device to authenticate the appointment. A scanner coupled to the validation device may read the characters off the ticket and send the ticket details to a server. The ticket details are verified at the server and the validation confirmation is then sent back to the user device. The process of scanning every user device or physical ticket on the validation device is a tedious and time-consuming task involving excessive manual efforts.

Further, such a validation process requires continuous network connectivity to facilitate exchange of data between the validation device and the server to validate tickets. In a situation, when network connectivity is lost or disrupted, the ticket validation process stops creating further inconvenience to users. Also, during peak times of usage, such as weekends, public holidays, office timings on weekdays, like 7 am to 9 am and 4 pm to 6 pm the rush at one or more setups of one or more service providers may increase due to increased footfall. In such a situation, validating each ticket separately may increase the rush at one or more setups creating a situation of chaos.

The present subject matter discloses example implementations of method and systems for rendering digitized services in a smart environment. In one example implementation of the present subject matter, techniques of rendering digitized services includes ascertaining a user preference for accessing a restricted setup, such as a transport vehicle, a commercial establishment, a place of entertainment or amusement and subsequently accessing permission for one or more such restricted setups are disclosed. The access permission may include one of a ticket, appointment, and an entry pass. In an example, the tickets for one or more restricted setups may be obtained at once and stored in a user device. Before visiting the one or more restricted setups, the user first activates the access permission. As the user comes in proximity of the restricted setup, one or more second control devices present in the vicinity are detected. The one or more second control devices may be wirelessly detected by one or more user devices using techniques of near field communication, such as Bluetooth. In one example, the one or more second control devices may be detected based on reception of plurality of data packets received from one or more control devices.

In an example of the present subject matter, the plurality of data packets received from one or more second control devices may be analysed to obtain access data from each of the second control devices. The access data received from one or more second control devices may further be compared with access permission data related to a ticket stored on the user device. Based on the comparison, a determination of a valid second control is made. A successful determination of the valid second control device indicates that the user has a valid access permission to enter the restricted setup. An authorization successful status indicating presence of a valid access permission may then sent to the valid second control device.

Thus, a single interface may be provided to assist a user in planning a days' itinerary and accessing one or more restricted setups. The single interface may allow the user to avail a variety of services on a single platform. This may avoid the requirement of multiple applications to avail different services thus saving system's resources and improving operational efficiency of the user device. The interface may further track the user's choices along with user's schedule to plan multiple actions, thus providing personalization of interface as per the user's daily itineraries. Further, the validation may take place on the user device and may be based on proximity of the user device and the second control device. This may avoid the requirement of the network connection for validation and may render the entire validation process efficient. Further, performing entire validation process on the user device may further reduce the load on second control devices and improve their operational efficiency. Furthermore, since the validation process involves the exchange of minimal exchange of data, i.e., the access permission data and the status indicating the successful validation of the ticket, the overall security of the user device is boosted. That is, even if the connection between the user device and the one or more control devices or the connection between the user device and the remote server is compromised, the user device credentials are not accessible.

The above techniques are further described with reference to FIGS. 1 to 4. It would be noted that the description and the Figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

Figure 1:
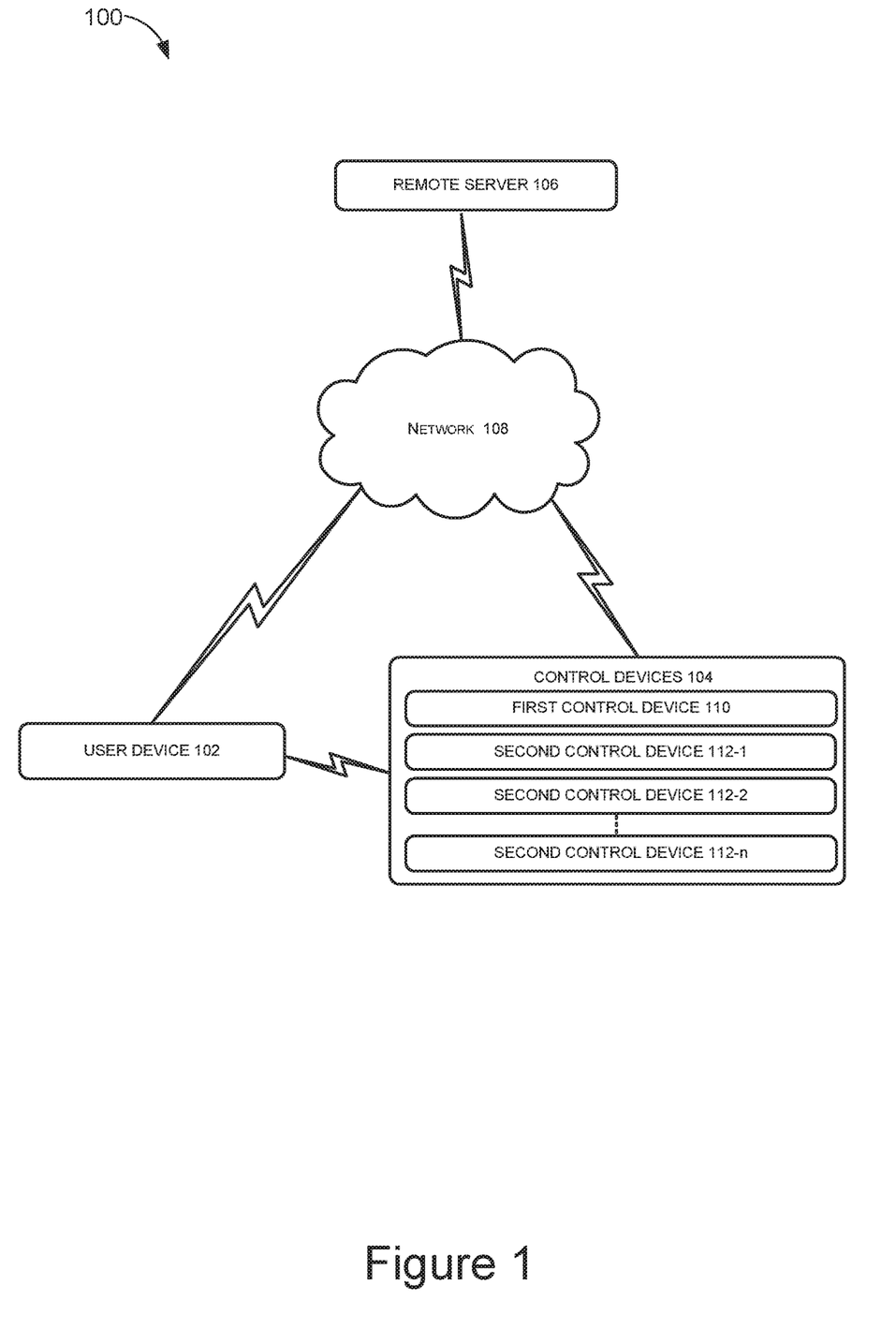
FIG. 1 illustrates a system for rendering digitized services in a smart environment, in accordance with an example implementation of present subject matter.

FIG. 1 illustrates a system 100 for rendering digitized services, in accordance with an example of present subject matter. The system 100 may provide a number of digitized services to the user. For instance, the system 100 may provide the user with a digital platform to plan and execute a first action. In an example, the first action may comprise visiting a restricted setup and availing services provided therein. The first action may be specified either based on a user input or user schedule saved in the user device. Examples of restricted setups may include, but are not limited to transport services including public transit services, such as bus, train, and trams, and private transport means, such as cabs, bike share, ride share, and car rentals services; and places of interest like health facilities, such as hospitals and clinics; commercial establishments, such as malls, offices, retail stores, banks and financial institutions, supermarkets; and places of entertainment and recreation, such as amusement parks, restaurants, theatres, bars, clubs.

Once the first action is defined, the system 100 may identify a plurality of second actions that are to be performed to execute the first action. In an example, when the first action includes commuting from one location to another location, the second action may include identification of one or more transport services for commuting between the first location and the second location, obtaining tickets for the identified one or more transport services, and other actions. In another example, when the first action includes visiting a place of interest, the second action may include obtaining one of the tickets, prior appointment, or entry pass for place of interest, validation of tickets at the place of interest, and other actions.

In one example implementation of the present subject matter, the system 100 may comprise a user device 102, one or more control devices 104, and a remote server 106. The user device 102 and the one or more control device 104 may be connected to the remote server via a network 108. The user device 102 may further be connected to one or more control device 104 via a wireless communication link. The wireless communication link may employ multiple wireless technologies that may include but are not limited to Wi-fi, Bluetooth, Near Field Communication (NFC), and Radio frequency identification (RFID).

Examples of the user device 102 may include, but are not limited to, smartphones, tablets, smartwatches, personal digital assistants, and other devices that may support wireless communication technologies. The one or more control device 104 may support wireless communication technologies. The one or more control device 104 may include a first control device 110 and one or more second control devices 112-1, 112-2, . . . , and 112-n. The second control devices 112-1, 112-2, . . . , and 112-n are hereinafter collectively referred to as second control devices 112 and individually referred to as second control device 112. The second control devices 112 may further be coupled to the first control device 110 by either a wired or wireless communication.

In an example implementation of present subject matter, the user device 102 may receive an input specifying the first action. In an example, the first action may include visiting a restricted setup. In response to the user input, an access permission to enter the restricted setup may be obtained. Once the access permission to enter the restricted setup is obtained by the user device 102, the user may first commute from his location to the location of the one or more restricted setups. On reaching the restricted setup, the user may activate the access permission saved on the user device 102. Once the access permission is activated, the presence of the second control devices 112, present in the proximity of the user device 102, may be detected. The second control devices 112 may be present in one or more restricted setups present in the proximity of the user device 102. A second control device, corresponding to the restricted setup to be visited, from the second control devices 112 may then be detected based on reception of one or more data packets from the second control devices 112.

In an example of the present subject matter, the one or more data packets received from the second control devices 112 may be analysed to obtain access data corresponding to the second control devices 112. The access data may include a second control device ID, and one of a route ID and a place ID depending on the type of restricted setup. For example, if the restricted setup is a transport service, the access data may include a route ID of the transport service. In another example, if the restricted setup is one of a hospital, mall, theatre, and hotel, the access data may include a place ID. In an example, the place ID may indicate the kind of services being provided in the restricted setups.

Further, the access data received from the second control devices 112 may be compared with an access permission data stored on the user device 102. The access permission data may include one of a ticket data, an entry pass data, and a prior appointment data. The access permission data may include one of a place ID and route ID, depending on the kind of services to be availed by the user. For example, if the user has booked a ticket to commute from one location to another location using transport service, the access permission data may include a route ID. In another example, if the user has booked an appointment at a hospital, the access permission data may include a place ID corresponding to one or more hospitals providing the services to be availed by the user. Further, comparing the access data with access permission data may include comparison of the route ID stored in access data with the route ID stored in access permission data or comparison of the place ID stored in access data with the place ID stored in access permission data.

Based on the comparison of the access data with the access permission data, a valid second device from among the second control devices 112 may be determined. The valid second control device may be present within the restricted setup for which the user device 102 has the access permissions. In response to determination of valid access permission, an authorization successful status indicating the presence of the valid access permission to enter the restricted setup may be transmitted to the second control device. In an example, the user device 102 may also send the access permission data along with the authorization successful status to the remote server 106.

Subsequently, the second control device may send the authorization successful status and the access permission data to the first control device 110 present within the restricted setup. The first control device 110 may receive the authorization successful status and the access permission data and check if a network connectivity to the remote server 106 is available. If network connectivity to the remote server 106 is available, the first control device 110 may transmit the authorization successful status and the access permission data to the remote server 106. Further, if the network connectivity is not found, the first control device 110 may retain the authorization successful status and the access permission data and wait for the network connectivity to be restored. Once the network connection is restored, the authorization successful status along with the access permission data may be transmitted to the remote server 106 by the first control device 110.

The remote server 106 may then receive the authorization successful status and the access permission data from the first control device 110 and user device 102. The authorization successful status along with access permission data received from the user device 102 and the first control device 110 may be then compared to ascertain consistency in the authorization status and access permission data received from the user device 102 and the first control device 110. If found consistent, the remote server 106 may make an entry into a database indicating the presence of the user at the restricted setup along with a time stamp. In case of inconsistency, the data received from the first control device 110 may be considered authentic as the user may have turned off internet on the mobile unintentionally or intentionally.

Figure 2:
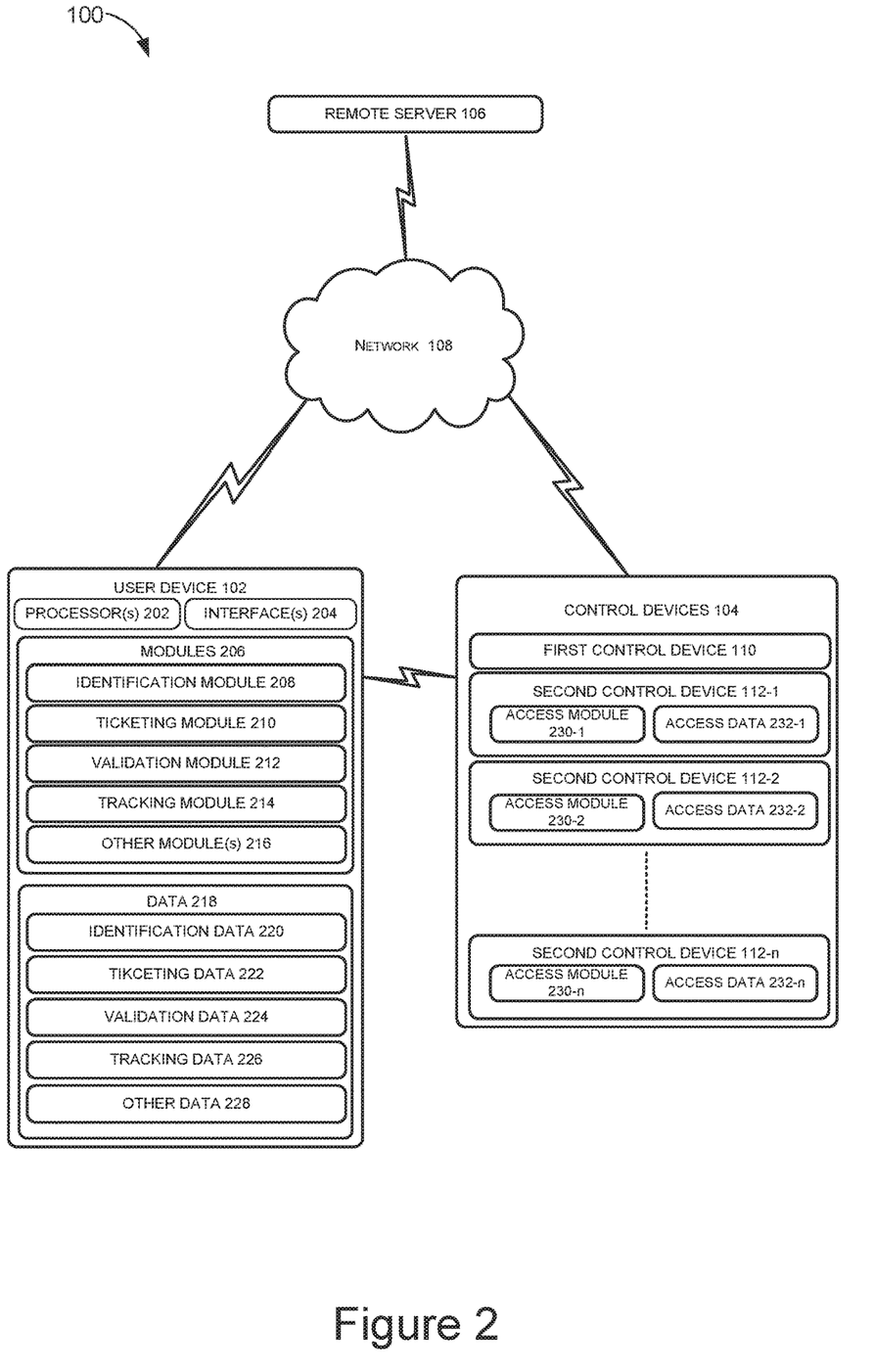
FIG. 2 illustrates a system for rendering digitized services in a smart environment, in accordance with another example implementation of present subject matter.

FIG. 2 illustrates a system 100 for rendering digitized services, in accordance with another example of present subject matter. As described earlier, the system 100 may include the user device 102, the control devices 104, and the remote server 106, connected to each other either directly or through the network 108.

The user device 102 may further include processor(s) 202 and interface(s) 204 coupled to the processor 202. The functions of the various elements shown in the Figures, including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, conventional and/or custom, may also be included.

The user device 102 may further include one or more modules 206. The modules 206 may include an identification module 208, a ticketing module 210, a validation module 212, a tracking module 214, other modules 216. In an example, the identification module 208, the ticketing module 210, the validation module 212, and other modules 216 may be implemented as separate hardware capable of performing different functionalities of the user device 102. The identification module 208, the ticketing module 210, the validation module 212, the tracking module 214, and other modules 216 may include routines, programs, objects, components, data structures, and the like, which perform particular tasks or implement particular abstract data types. The modules 206 may further include electronic circuitry or a combination of electronic circuitry and control programs that operate the components according to the functions described herein. In an example, the other modules 216 may perform functionalities that supplement other functions of the user device 102.

The user device 102 may further include data 218. The data 218 serves, among other things, as a repository for storing data that may be fetched, processed, received, or generated by the identification module 208, the ticketing module 210, the validation module 212, the tracking module 214, and other modules 216. In an example, the data 218 may include identification data 220, ticketing data 222, validation data 224, tracking data 226, and other data 228. In an example of the present subject matter, the identification data 220 may include an input provided by the user related to the identification of the first action to be performed. In an example, the first action may comprise the user input for commuting from one location to another location. The ticketing data 222 may include all the tickets purchased by the users for availing services in one or more restricted setups. Further, the validation data 224 may include ticket detection data corresponding to one or more tickets purchased by the user. The tracking data 226 may comprise the data related to presence of second control devices 112 in the proximity of the user device 102. The data 218 may further include other data 228 to store data generated by other modules 216 of the user device 102.

Further, each of the second control device 112 may comprise an access module 230 and access data 232. In an example, a second control device 212-1 may comprise an access module 230-1 and an access data 232-1, a second control device 212-2 may comprise an access module 230-2 and an access data 232-2, ..., a second control device 212-*n* may comprise an access module 230-*n* and an access data 232-*n*. The access module 230 may allow the second control device 112 to transmit and receive data. The data may be transmitted and received either through a wired or a wireless connection. Further, the access data may comprise one of an access permission data and a ticket detection data. The access permission data may include place ID and ticket detection data may include route ID.

In an example implementation of present subject matter, a user may use the user device 102 to plan and schedule the itinerary for the day. In one example, a user may save his schedule in the user device 102 to personalise the activities to be carried out at a predetermined time on each day. In one another example, the user may provide inputs every day to schedule the itinerary. To plan the itinerary, the user may provide inputs to the user device 102 through different interfaces 204, such as a graphical user interface. In an example, the user may have a schedule to commute from home to work every day at a predetermined time, say, 8:00 am. The user device 102 accordingly may suggest the user to leave for work as per the schedule. In one example, the user may use a transport service which may include a public transit service, including but not limited to, buses, trains, taxi, and trams; a private cab; or a personal vehicle to commute from home to work.

In case the user uses the personal vehicle to commute, the user device 102 may suggest available routes based on one or more conditions, such as traffic, weather, and best route. However, in a situation where the personal vehicle of the user is not available, for instance, because of pending service schedule, the user device 102 may assist the user in availing the services of a public transit service or a private cab. For example, the user may make an entry in his schedule to indicate that his vehicle is out for service. The identification module 208 of the user device 102 may analyse the change in user schedule and next day at 8:00 suggest the user to leave for work using one or more other transport services that the user may take to commute from home to work.

To assist the user in availing transport services apart from the user's private vehicle, the ticketing module 210 of the user device 102 may initially determine one or more first transport service for commuting between the home and work based on one or more travel conditions that may include user preferences, saved trips, saved routes, traffic, weather, best route, cost availability, and occupancy of the one or more transport services. Accordingly, a list of one or more transport services may be rendered to the user along with real-time location, occupancy, and an estimated time of arrival of one or more transport services. The user may then select a first transport service from one or more determined transport services.

Further, the ticketing module 210 may obtain a ticket for the first transport service selected by the user. The ticket may include a ticket identifier where the ticket identifier may include a ticket number and a route ID for commuting between the home and work using the first transport service. Once the ticketing module 210 has obtained the ticket, the validation module 212 may be informed about the scheduled time for a vehicle of the first transport service. Once the ticket is obtained, the user may reach the proximity of the restricted setup and may activate the ticket. Subsequently, the validation module 212 of the user device 102 may initiate detection of the second control devices 112 in the proximity of the user device 102, at a predetermined time before the scheduled time of the first transport service. In an example, the predefined time may be a period of, say 2 minutes before the scheduled time of the vehicle of the first transport service.

Once the validation module 212 initiates the detection, the validation module 212 may receive ticket detection data from the second control devices 112 coming in proximity with the user device 102, for instance, when the user reaches a bus stop. In an example, the validation module may receive ticket detection data transmitted by the access module 230 of the second control devices 112. The second control devices 112 may transmit the ticket detection data using a wireless technology, including but not limited to, Bluetooth, wi-fi, NFC, RFID and others. In an example, the ticket detection data may include a route ID and a second control device ID. The route ID may indicate the route of the transport service on which a vehicle having the second control device 112 is plying. The second control device ID may be indicative of an identification number of the second control device 112 transmitting the ticket detection data.

In one example, the second control devices 112 may transmit the ticket detection data when they are approaching a designated stop of the vehicle having the second control device 112. In another example, the second control devices 112 may periodically transmit the ticket detection data, at a predetermined frequency, say, every 20 seconds.

The validation module 212 may receive ticket detection data from the one or more second control devices 112 and compare the ticket detection data with the ticket. The user device 102 may compare the route ID received in the ticket detection data with a route ID corresponding to the ticket. If the route ID received in the ticket detection data is found to be consistent with the route ID corresponding to the ticket for a second control device 112, say the second control device 112-1, the validation module 212 may send a status indicating a valid ticket to the second control device 112-1, along with the ticket identifier. In an example, the valid ticket may indicate a ticket that has been successfully validated. On successful validation of the ticket by the user device 102, the user may board the vehicle having the second control device 112-1 detected by the validation module 112, to commute from home to work. The validation module 212 may further transmit the ticket identifier and a status indicating the boarding of vehicle to the remote server 106.

The second control device 112-1 may further send the status indicating the valid ticket and the ticket identifier to the first control device 110. The first control device 110 may then check the presence of a network connection to access the remote server 106. If the presence of the network connection between the first control device 110 and the remote server 106 is confirmed, the first control device may transmit the status indicating the valid ticket and the ticket identifier to the remote server 106. In an example, the first control device 110 may check for the presence of the network connection at regular intervals, and may transmit to the remote server 106, the status indicating a valid ticket and the ticket identifier corresponding to one or more user devices accordingly.

Once the user has boarded the vehicle providing the first transport service, the tracking module 214 of the user device 102 may further ascertain the presence of the second control device 112 at regular intervals. The presence of the second control device 112 may be ascertained based on the detection of messages from the second control device at regular intervals, where the message from the second control device may include a route ID. The route ID included in the message from the second control device may then be compared with the route ID stored in the valid ticket. If the route ID included in the message from the second control device is found to be consistent with the route ID stored in the valid ticket, the tracking module 214 may transmit a data packet to the remote server 106, where the data packet may include the geographical location of the user device 102 along with a timestamp.

The remote server 106 may receive one or more data packets from one or more user devices. The data packets may indicate the presence of the user devices in the vehicle and geographical location of the user devices along with timestamp. The data packets received from one or more user devices may then be analysed at the remote server 106 to determine various parameters, such as the occupancy of the vehicle and the traffic. The remote server 106 may then determine the occupancy ratio of the vehicle. In an example, the occupancy ratio of the vehicle may be determined by comparison of occupancy of the vehicle with threshold capacity of the vehicle. In an example, the threshold capacity may be a maximum seating capacity of the vehicle. The remote server 106 may further determine the estimated time of arrival of the vehicle at the location of a user device 102 out of one or more user devices. Based on the occupancy ratio and the estimated time of arrival, the remote server 106 may then suggest an alternate transport service to a user device from one or more user devices.

In an example implementation of present subject matter, the user after reaching work may further wish to visit a place of interest to avail one or more services. In an example, the place of interest may include one or more restricted setups, including but not limited to, health facilities, such as hospitals and clinics; commercial establishments, such as malls, offices, retail stores, banks and financial institutions, supermarkets; places of entertainment and recreation, such as amusement parks, restaurants, theatres, bars, clubs; and other places. In an example, the user may wish to visit a theatre to watch a movie, for instance, after working hours are over. The user may thus travel from the work to the theatre in a public transit service to watch the movie. In an example, the identification module 208 may thus identify second actions to be performed, based on user's input for the first action involving watching a movie, for example, a search request for movie timings, or a request for booking tickets. The first actions may be identified as commuting from work to theatre and then visiting the theatre. Accordingly, the ticketing module 210 may obtain tickets to commute from work to theatre and to watch the movie at the theatre, as previously described.

Further, the user may commute from the work to the theatre using a transport service in one or more transport services as described above. Once the user reaches the theatre, the user device 102 may initiate detection of the second control device 112 located within the theatre, for instance, by switching ON a communication interface for receiving broadcast data packets, transmitted by the second control devices 112. As previously described, the validation module 212 may receive ticket detection data from second control devices 112 installed in a complex housing of the theatre. The ticket detection data may include a place ID and a second device ID. The place ID received in the ticket detection data may be compared with the place ID stored in the ticket. If the place ID received in the ticket detection data is found to be same as place ID stored in the ticket, the validation module 212 may send a status indicating the detection of a valid ticket to the second control device 112, requesting the second control device 112 for an access to the theatre. The validation module 212 may further transmit a status indicating the presence of the user at the theatre to the remote server 106.

The second control device 112-1 may further send the status indicating the valid ticket and the ticket identifier to the first control device 110. The first control device may then check the presence of a network connection to access the remote server 106. If the presence of the network connection between the first control device 110 and remote server 106 is confirmed, the first control device may transmit the status indicating the valid ticket and the ticket identifier to the remote server 106. In an example, the first control device may check for the presence of the network connection at regular intervals, and may transmit the status indicating a valid ticket and the ticket identifier corresponding to one or more user devices accordingly.

Once the user enters the theatre, the tracking module 214 of the user device 102 may further ascertain the presence of the second control device 112 at regular intervals. The presence of the second control device may be ascertained based on the detection of messages from the second control device at regular intervals, where the message from the second control device may include a place ID. The place ID included in the message from the second control device may then be compared with the place ID stored in the valid ticket. If the place ID included in the message from the second control device is found to be consistent with the place ID stored in the valid ticket, the tracking module 214 may transmit a data packet to the remote server 106, where the data packet may indicate the presence of the user at the theatre along with a timestamp.

In one example, the remote server 106 may receive one or more data packets from one or more user devices within a restricted setup, say, the theatre. The data packets may indicate the presence of the user devices at the restricted setup along with timestamp. The data packets received from one or more user devices may then be analysed at the remote server 106 to determine the occupancy of the restricted setup. The remote server 106 may then determine the occupancy ratio of the restricted setup. In an example, the occupancy ratio of the restricted setup may be determined by comparison of occupancy of the restricted setup with threshold capacity of the restricted setup. If the occupancy of the restricted setup is determined to be equal to or above a predetermined threshold occupancy, the remote server 106 may suggest an alternate restricted setup to other user devices trying to obtain access permit for the restricted setup. In an example, the threshold occupancy of the theatre may be a maximum seating capacity of the theatre.

For instance, in the above example, the remote server 106 may receive one or more data packets from one or more user devices within the theatre. The data packets may indicate the presence of the user devices at the theatre along with timestamp. The data packets received from one or more user devices may then be analysed at the remote server 106 to determine the occupancy of the theatre and the occupancy ratio of the theatre. If the occupancy of the theatre is determined to be equal to or above a predetermined threshold, say, maximum seating capacity, the remote server 106 may suggest an alternate theatre to other user devices trying to obtain access permit for the theatre.

Figure 3:
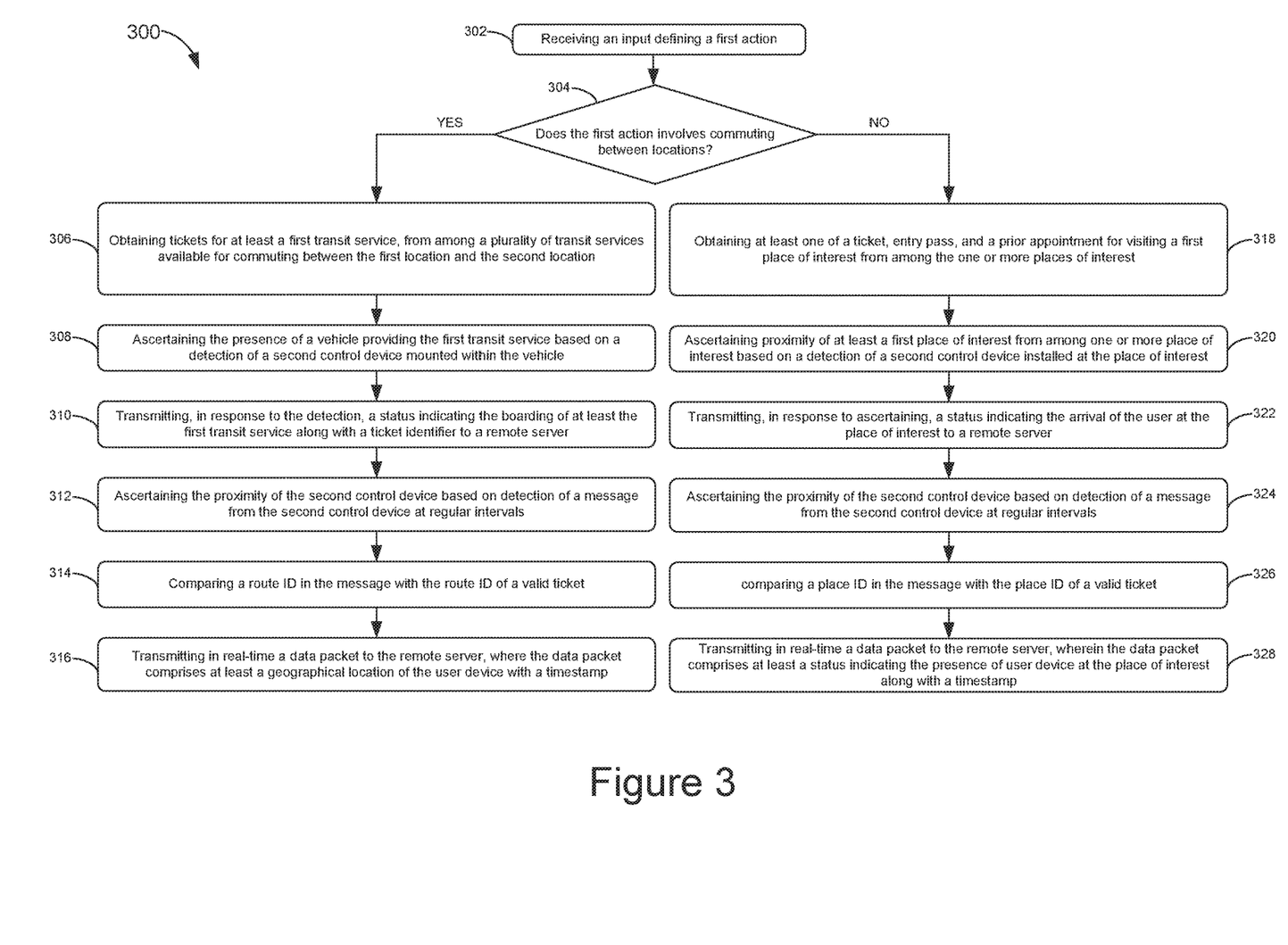
FIG. 3 illustrates a method for rendering digitized services, in accordance with an example implementation of present subject matter.
Figure 4:
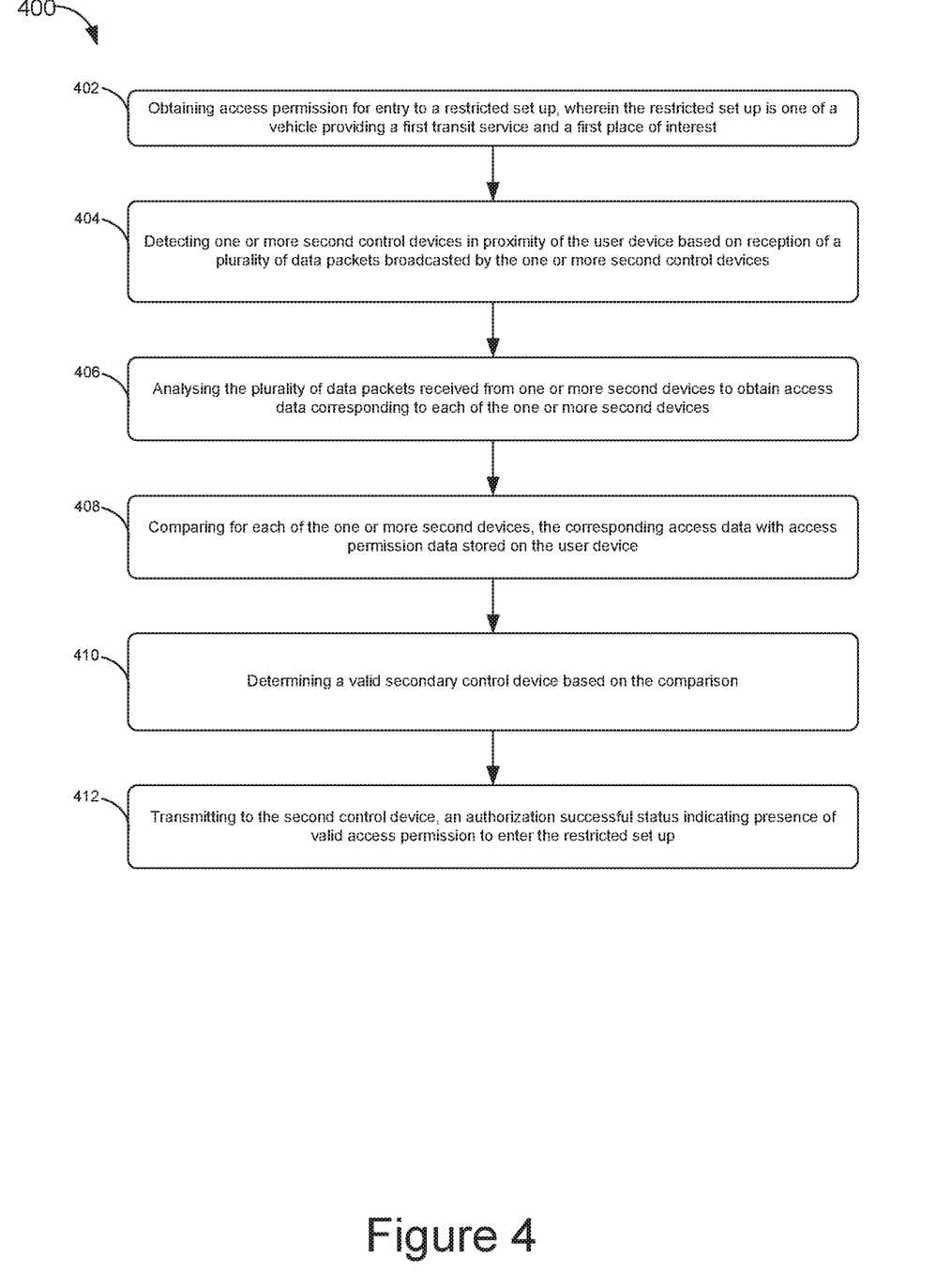
FIG. 4 illustrates a method of validation of a user device in a restricted setup, in accordance with an example implementation of present subject matter.

FIGS. 3-4 illustrate example methods 300 and 400, respectively, for rendering digitized services in a smart environment. The order in which the methods are described is not intended to be construed as a limitation, and any number of the described method blocks may be combined in any order to implement the methods, or an alternative method. Furthermore, methods 300 and 400 may be implemented by processing resource or computing device(s) through any suitable hardware, non-transitory machine-readable instructions, or combination thereof.

It may also be understood that methods 300 and 400 may be performed by programmed computing devices, such as system 100, which may include user devices 102, second control devices 112, and remote server 106 as depicted in FIGS. 1-2. Furthermore, the methods 300 and 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 300 and 400 are described below with reference to user devices 102, second control device 112, and remote server 106 as described above; other suitable systems for the execution of these methods may also be utilized. Additionally, implementation of these methods is not limited to such examples.

The method starts at block 302. At block 302, an input defining a first action is received from a user. The input may be received by an interface of the user device, such as interface 204 of the user device 102.

At block 304, it is determined whether a first action involves commuting between two locations, say, a first location and a second location. In an example, the first action may be identified based on a user input or a user schedule, by an identification module of a user device, such as the identification module 208 of the user device 102. If in case it is determined that the first action involves commuting between two locations, ('Yes' path from block 304), the method proceeds to block 306.

At block 306, tickets are obtained for at least a first transport service, from among a plurality of transport services available for commuting between the first location and the second location. In one example, the ticket includes a ticket identifier indicating at least a ticket number and a route ID for commuting between the first location and the second location using the first transport service. In an example, tickets for the first transport service may be obtained by a ticketing module of the user device, such as a ticketing module 210 of the user device 102.

At block 308, the presence of a vehicle providing the first transport service is ascertained based on a detection of a second control device mounted within the vehicle. In an example, the presence of the vehicle providing the first transport service may be ascertained by a validation module of the user device, such as the validation module 212 of the user device 102, based on a detection of a second control device, such as the second control device 112 mounted within the vehicle.

At block 310, in response to detection, the user device transmits a status indicating the boarding of at least the first transport service along with a ticket identifier to a remote server. In an example, a tracking module of the user device, such as tracking module 214 of the user device 102, may transmit the status indicating the boarding of at least the first transport service along with the ticket identifier to the remote server 106.

At block 312, the proximity of the second control device is ascertained based on detection of a message from the second control device at regular intervals, where the message comprises at least the route ID. In an example, the proximity of the second control device 112 may be ascertained by the tracking module 214 of the user device 102.

At block 314, the route ID in the message is compared with the route ID of a valid ticket. In an example, the route ID in the message may be compared with the route ID of the valid ticket by the tracking module 214 of the user device 102.

Finally, at block 316, a data packet is transmitted in real-time to the remote server, where the data packet comprises at least the geographical location of the user device along with a timestamp. In an example, the data packet is transmitted by the tracking module 214 of the user device 102 to the remote server 106.

If at block 304, it is determined that the first action does not involve commuting between the two locations at least one of a ticket, entry pass, and a prior appointment is obtained at block 318. In one example, the ticket, entry pass, or the prior appointment may be obtained for visiting a first place of interest from among the one or more places of interest. In an example, the ticketing module 210 of the user device 102 may obtain at least one of a ticket, entry pass, and a prior appointment for visiting a first place of interest from among the one or more places of interest. The method, thereafter, proceeds to block 320.

At block 320, the proximity of at least a first place of interest from among one or more place of interest is ascertained based on the detection of a second control device installed at the place of interest. In an example, the proximity of the first place of interest may be ascertained by the validation module 212 of the user device 102, based on the detection of a second control device 112 installed at the place of interest.

At block 322, in response to ascertaining, a status indicating the arrival of the user at the place of interest is transmitted to the remote server. In an example, the validation module 212 of the user device 102 may transmit a status indicating the arrival of the user at the place of interest to the remote server 106.

At block 324, the proximity of the second control device is ascertained based on detection of a message from the second control device at regular intervals, where the message comprises at least the place ID. In an example, the tracking module 214 of the user device 102 may ascertain the proximity of the second control device 112 based on detection of the message from the second control device 112.

At block 326, the place ID in the message is compared with the place ID of a valid ticket. In an example, the place ID in the message may be compared with the place ID of the valid ticket by the tracking module 214 of the user device 102.

Finally, at block 328, a data packet is transmitted in real-time to the remote server, where the data packet comprises at least a status indicating the presence of the user device at the place of interest with a timestamp. In an example, the data packet is transmitted by the tracking module 214 of the user device 102 to the remote server 106.

FIG. 4 illustrates a method 400 of validation of a user device in a restricted setup, in accordance with an example implementation of the present subject matter.

At block 402, an access permission for entry to a restricted set up is obtained, where the restricted set up is one of a vehicle providing a first transport service and a first place of interest. In an example, the access permission may be obtained by a ticketing module of a user device, such as the ticketing module 210 of the user device 102.

At block 404, the second control devices in proximity of the user device may be detected based on reception of a plurality of data packets broadcasted by the second control devices, where the second control devices are present within one or more restricted set up in proximity to the user device. In an example, a validation module of the user device, such as the validation module 212 of the user device 102 may detect the second control devices 112 based on reception of the plurality of data packets broadcasted by the second control devices 112. The method, thereafter proceeds to block 406.

At block 406, the plurality of data packets received from one or more second devices are analysed to obtain access data corresponding to each of the second control devices, where the access data comprises a second control device Id and one of a place Id and route Id. In an example, the validation module 212 of the user device 102 may analyse the plurality of data packets to obtain access data 232 corresponding to each of the one or more second devices 112. The method, thereafter proceeds to block 408.

At block 408, the access corresponding to each of the second control devices is compared with access permission data stored on the user device, where the access permission data comprises one of a route ID and place ID. In an example, the validation module 212 of the user device 102 may compare the access data 232 corresponding to each of the second control device 112 with access permission data stored on the user device 102.

At block 410, a valid second control device is determined based on the comparison, where the valid second control device is present within the restricted set up for which the user device has the access permission. In an example, a valid second device 112 may be determined by the validation module 212 of the user device 102.

Finally, at block 412, an authorization successful status indicating presence of valid access permission to enter the restricted set up is transmitted to the second control device. In an example, the validation module 212 of the user device 102 may transmit the authorization successful status indicating presence of valid access permission to enter the restricted set up to the second control device 112.

Although examples for the present disclosure have been described in language specific to structural features and/or methods, it would be understood that the appended claims are not necessarily limited to the specific features or methods described. Rather, the specific features and methods are disclosed and explained as examples of the present disclosure.

I claim:

1. A system to render digitized services in a smart environment, the system comprising:
    a user device comprising:
        an identification module to:
            identify a first action based on at least one of a user input and a user schedule,
            wherein the first action includes at least commuting between a first location and a second location using at least one transport service;
        a ticketing module to:
            obtain a ticket for at least a first transport service, from among a plurality of transport services available for commuting between the first location and the second location, wherein the ticket includes a ticket identifier, wherein the ticket identifier indicates at least a ticket number and a route ID for commuting between the first location and the second location using the first transport service; and
        a validation module to:
            ascertain the presence of a vehicle providing the first transport service based on a detection of a second control device mounted within the vehicle, wherein the second control device is detected based on proximity between the user device and the second control device;
            receive ticket detection data, from the second control device, wherein the ticket detection data comprises at least a route ID and a second control device ID;
            validate the ticket based on a comparison of the route ID received in the ticket detection data with the route ID corresponding to the ticket;
            transmit at least one of a status indicating a valid ticket and the ticket identifier to the second control device; and
            transmit the ticket identifier and a status indicating the boarding of the vehicle to a remote server; and
    a first control device to:
        receive at least one of a status indicating a valid ticket and the ticket identifier from the second control device, and
        transmit at least one of the status indicating the valid ticket and the ticket identifier to the remote server.

2. The system as claimed in claim 1, wherein the user schedule comprises at least one of saved trips, user preferences, saved source and destination locations, and travel timings.

3. The system as claimed in claim 1, wherein the ticketing module is to:
    obtain a list of a plurality of transport services available between the first location and the second location;
    determine one or more transport services, from among the plurality of transport services, for commuting between the first location and the second location, wherein the one or more transport services are determined based on one or more travel conditions comprising user preferences, saved trips, saved routes, traffic, weather, best route, cost availability, and occupancy of the one or more transport services;
    render the one or more transport services to the user, along with real-time location, occupancy, and an estimated time of arrival of the one or more transport services; and
    select at least a first transport service from the one or more transport services based on the user input.

4. The system as claimed in claim 1, wherein the ticketing module further activates the ticket based on the user input.

5. The system as claimed in claim 1, wherein the first control device further is to:
    transmit, to the remote server, at least one of the status indicating the valid ticket and the ticket identifier based on at least the presence of a network connection.

6. The system as claimed in claim 1, the user device further comprising a tracking module to:
    ascertain the proximity of the second control device based on detection of a message from the second control device at regular intervals, wherein the message comprises at least the route ID;
    compare the route ID in the message with the route ID of the valid ticket; and
    transmit in real-time, a data packet to the remote server, wherein the data packet comprises at least a current geographical location of the user device along with a timestamp.

7. The system as claimed in claim 6, wherein the remote server further is to:

receive from one or more user devices, data packets indicating the presence of the user devices in the vehicle and geographical location of the user devices along with timestamp;

analyse data packets received from the one or more user devices to determine at least one of traffic and occupancy of the vehicle;

determine, based on the analyses of the data packets, at least the one of the occupancy of the vehicle and traffic;

determine, an occupancy ratio of the vehicle, wherein the occupancy ratio is determined by comparison of the occupancy of the vehicle and a threshold capacity of the vehicle;

determine, the estimated time of arrival of the vehicle at the location of the user device; and suggest, based on the occupancy ratio and the estimated time of arrival, an alternate transport service for commuting between the first location and the second location to other user devices.

8. The system as claimed in claim 1, wherein for the first action comprising visiting a place of interest, the ticketing module is to:

obtain at least one of a ticket, an entry pass, and a prior appointment for visiting a first place of interest from among the one or more places of interest; and the validation module is to:

ascertain proximity of at least a first place of interest from among one or more place of interest based on a detection of a second control device installed at the place of interest; and transmit, in response to ascertaining, a status indicating the arrival of the user at the place of interest to the remote server.

9. A method for rendering digitized services in a smart environment, the method comprising:

identifying, by a user device, a first action based on at least one of a user input and a user schedule, wherein the first action comprises at least commuting between a first location and a second location using at least one transport service;

obtaining, by the user device, a ticket for at least a first transport service, from among a plurality of transport services available for commuting between the first location and the second location, wherein the ticket includes a ticket identifier, wherein the ticket identifier indicates at least a ticket number and a route ID for commuting between the first location and the second location using the first transport service;

ascertaining, by the user device, the presence of a vehicle providing the first transport service based on a detection of a second control device mounted within the first transport service, wherein the second control device is detected based on proximity between the user device and the second control device;

receiving, from the second control device, ticket detection data wherein the ticket detection data comprises at least a route ID and second control device ID;

validating, by the user device, the ticket based on a comparison of the route ID received in the ticket detection data with a route ID corresponding to the ticket;

transmitting, by the user device, at least one of a status indicating a valid ticket and the ticket identifier to a second control device;

transmitting, by the user device, in response to the ascertaining, the ticket identifier and a status indicating the boarding of the vehicle to a remote server;

transmitting, by the second control device, at least one of a status indicating a valid ticket and the ticket identifier to a first control device; and transmitting, by the first control device, at least one of the status indicating the valid ticket and the ticket identifier to the remote server.

10. The method as claimed in claim 9, wherein the identification of the first action further comprises:

obtaining a list of a plurality of transport services available between the first location and the second location, determine one or more transport services, from among the plurality of transport services, for commuting between the first location and the second location, wherein the one or more services are determined based on one or more travel conditions comprising user preferences, saved trips, saved routes, traffic, weather, best route, cost availability, and occupancy of the one or more transport services;

render the one or more transport services to the user, along with real-time location, occupancy, and an estimated time of arrival of the one or more transport services; and selecting at least a first transport service from the plurality of transport services based on the user input.

11. The method as claimed in claim 9, wherein obtaining the tickets for at least a first transport service further comprises activating the ticket based on the user input.

12. The method as claimed in claim 9, the method further comprising:

ascertaining the proximity of the second control device based on detection of a message from the second control device at regular intervals, wherein the message comprises at least the route ID;

comparing the route ID in the message with the route ID of the valid ticket; and transmitting in real-time, by the user device, a data packet to the remote server, wherein the data packet comprises at least the geographical location of the user device along with a timestamp.

13. The method as claimed in claim 12, the method further comprising:

receiving from one or more user devices, data packets indicating the presence of the user devices in the vehicle and geographical location of the user devices along with timestamp;

analysing data packets received from the one or more user devices to determine at least one of the traffic and occupancy of the vehicle;

determining, based on the analyses of the data packets, at least the one of the occupancy of the vehicle and traffic;

determining, an occupancy ratio of the vehicle, wherein the occupancy ratio is determined by comparing the occupancy of the vehicle and a threshold capacity of the vehicle;

determining, the estimated time of arrival of the vehicle at the location of the user device; and suggesting, based on the occupancy ratio and the estimated time of arrival, an alternate transport service for commuting between the first location and the second location to other user devices.

14. The method as claimed in claim 9, wherein for the first action comprising visiting one or more places of interest, the method comprises:

obtaining at least one of a ticket, entry pass, and a prior appointment for visiting a first place of interest from among the one or more places of interest;

ascertaining proximity of at least a first place of interest from among one or more place of interest based on a detection of a second control device installed at the place of interest; and transmitting, in response to ascertaining, a status indicating the arrival of the user at the place of interest to the remote server.

15. A method of rendering digitized services in a smart environment, the method comprising:
   identifying, at a user device, a first action based on at least one of a user input and a user schedule, wherein the first action comprises at least one of:
      commuting between a first location and a second location using at least one transport service; and
      visiting one or more places of interest;
   identifying a plurality of second actions based on the first actions, wherein for the first action comprising commuting between the first location and the second location, the second actions comprise:
      obtaining a ticket for at least a first transport service, from among a plurality of transport services available for commuting between the first location and the second location, wherein the ticket includes a ticket identifier, and wherein the ticket identifier indicates at least a ticket number and a route ID for commuting between the first location and the second location using the first transport service; and
      ascertaining the presence of a vehicle providing the first transport service based on a detection of a second control device mounted within the vehicle, wherein the second control device is detected based on proximity between the user device and the second control device;
   receiving, from the second control device, ticket detection data wherein the ticket detection data comprises at least a route ID and second control device ID;
   validating the ticket by comparing the route ID received in the ticket detection data with the route ID corresponding to the ticket; and
   transmitting, in response to the detection, a status indicating the boarding of at least the first transport service along with the ticket identifier to a remote server;
   wherein for the first action comprising visiting one or more places of interest, the second actions comprise:
      obtaining at least one of a ticket, entry pass, and a prior appointment for visiting a first place of interest from among the one or more places of interest;
      ascertaining proximity of at least a first place of interest from among one or more place of interest based on a detection of a second control device installed at the place of interest, wherein the second control device is detected based on proximity between the user device and the second control device; and
      transmitting, in response to ascertaining, a status indicating the arrival of the user at the place of interest to the remote server.

16. The method as claimed in claim 15, wherein the first action comprises commuting between the first location and the second location by using at least one transport service, the method further comprising:
   ascertaining the proximity of the second control device based on detection of a message from the second control device at regular intervals, wherein the message comprises at least the route ID;
   comparing the route ID in the message with the route ID of the valid ticket; and
   transmitting in real-time, by the user device, a data packet to the remote server, wherein the data packet comprises at least the geographical location of the user device along with a timestamp.

17. The method as claimed in claim 16, the method further comprising:
   receiving from one or more user devices, data packets indicating the presence of the user devices in the vehicle and geographical location of the user devices along with timestamp;
   analysing data packets received from the one or more user devices to determine at least one of the traffic and occupancy of the vehicle;
   determining, based on the analyses of the data packets, at least the one of the occupancy of the vehicle and traffic;
   determining, an occupancy ratio of the vehicle, wherein the occupancy ratio is determined by comparing the occupancy of the vehicle and a threshold capacity of the vehicle;
   determining, an estimated time of arrival of the vehicle at the location of the user device; and
   suggesting, based on the occupancy ratio and the estimated time of arrival, an alternate transport service for commuting between the first location and the second location to other user devices.

18. The method as claimed in claim 15, wherein the first action comprises visiting one or more places of interest, ascertaining proximity of at least a first place of interest from among one or more place of interest further comprises:
   receiving, from the second control device, a ticket detection data comprising at least one of a place ID and second control device ID;
   comparing the place ID received in the ticket data with a place ID stored in the ticket;
   transmitting a status indicating detection of a valid ticket to the second control device.

19. The method as claimed in claimed in claim 15, wherein the first action comprises visiting a place of interest, the method further comprising:
   ascertaining the proximity of the second control device based on detection of a message from the second control device at regular intervals, wherein the message comprises at least the place ID;
   comparing the place ID in the message with the place ID of the valid ticket; and
   transmitting in real-time, by the user device, a data packet to the remote server, wherein the data packet comprises at least a status indicating the presence of user device at the place of interest along with a timestamp.

20. The method as claimed in claim 19, the method further comprising:
   receiving from user devices, the data packets indicating the presence of one or more user devices at the place of interest;
   analysing, at the remote server, data packets received from the one or more user devices to determine conditions comprising at least an occupancy of the place of interest;
   determining, based on the analyses of the data packets, at least the occupancy of a place of interest from among the one or more places of interest;
   determining an occupancy ratio of the place of interest from among the places of interest, wherein the occupancy ratio is determined by comparing the occupancy of the place of interest and a predetermined threshold occupancy of the place of interest; and suggesting, based on the occupancy ratio, an alternate place of interest from one or more places of interest providing similar services to other user devices.

\* \* \* \* \*